(12) United States Patent
Sagen

(10) Patent No.: US 9,083,503 B2
(45) Date of Patent: Jul. 14, 2015

(54) SYNCHRONIZED CLOCK EVENT REPORT

(71) Applicant: Schweitzer Engineering Laboratories, Inc., Pullman, WA (US)

(72) Inventor: Eric A. Sagen, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 138 days.

(21) Appl. No.: 13/875,953

(22) Filed: May 2, 2013

(65) Prior Publication Data

US 2014/0328441 A1    Nov. 6, 2014

(51) Int. Cl.
*H04L 7/00* (2006.01)

(52) U.S. Cl.
CPC .................................. *H04L 7/0079* (2013.01)

(58) Field of Classification Search
CPC . H04W 56/0015; H04W 56/001; H04W 4/20; H04W 56/00; H04J 3/0658; H04J 3/0638; H04J 3/065; H04J 3/0685; H04J 3/1611; H04L 67/325; H04L 41/22; H04L 29/06; H04L 69/18; H04L 41/0856; H04L 7/0008; H04L 41/0803; H04L 43/50; G01S 13/34; G01S 13/751; G06F 1/14
USPC ......................................................... 375/356
See application file for complete search history.

(56) References Cited

U.S. PATENT DOCUMENTS

| | | |
|---|---|---|
| 5,160,926 A | 11/1992 | Schweitzer |
| 5,557,284 A | 9/1996 | Hartman |
| 5,737,715 A | 4/1998 | Deaton |
| 6,144,334 A | 11/2000 | Claffey |
| 6,229,479 B1 | 5/2001 | Kozlov |
| 7,146,516 B2 | 12/2006 | Dhupar |
| 7,375,683 B2 | 5/2008 | Smith |
| 7,398,411 B2 | 7/2008 | Zweigle |
| 7,436,232 B2 | 10/2008 | Sivero |
| 7,440,427 B1 | 10/2008 | Katz |
| 7,940,213 B2 | 5/2011 | Harper |

(Continued)

FOREIGN PATENT DOCUMENTS

| | | |
|---|---|---|
| WO | 9747987 | 12/1997 |
| WO | 2012151006 | 11/2012 |
| WO | 2014005016 | 1/2014 |

OTHER PUBLICATIONS

PCT/US2014/010507 Patent Cooperation Treaty, International Search Report and Written Opinion of the International Searching Authority, May 6, 2014.

(Continued)

*Primary Examiner* — Don N Vo
(74) *Attorney, Agent, or Firm* — Stoel Rives LLP; Richard M. Edge

(57) ABSTRACT

The present application discloses monitoring a plurality of time inputs to detect a defined time event and providing a report of the plurality of time inputs for analysis in response to detecting the defined time event. To create the report, an event monitor records data relating to the plurality of time inputs in a temporary memory for a defined window of time. In response to detecting the defined time event, the event monitor transfers the data recorded in the temporary memory to a persistent memory and continues to record data relating to the plurality of time inputs to the persistent memory for a second defined window of time. The event monitor provides a report of the data relating to the plurality of time inputs stored in the persistent memory for analysis.

20 Claims, 4 Drawing Sheets

(56) References Cited

U.S. PATENT DOCUMENTS

| | | | |
|---|---|---|---|
| 7,952,519 | B1 | 5/2011 | Nielsen |
| 7,978,130 | B1 | 7/2011 | Cohen |
| 7,979,228 | B2 | 7/2011 | Zurbuchen |
| 8,055,288 | B2 | 11/2011 | Ladd |
| 8,138,972 | B2 | 3/2012 | Underbrink |
| 8,159,391 | B2 | 4/2012 | Papadimitratos |
| 8,237,609 | B2 | 8/2012 | Talbot |
| 8,325,087 | B2 | 12/2012 | Thomson |
| 8,326,319 | B2 | 12/2012 | Davis |
| 8,446,896 | B2 | 5/2013 | Bedrosian |
| 8,564,330 | B1 | 10/2013 | Radulov |
| 8,655,608 | B2 | 2/2014 | Guzman-Casillas |
| 2003/0087654 | A1 | 5/2003 | Wheeler |
| 2006/0259806 | A1 | 11/2006 | Zweigle |
| 2007/0132773 | A1* | 6/2007 | Plante ............................ 345/564 |
| 2007/0194987 | A1 | 8/2007 | Fedora |
| 2008/0169978 | A1 | 7/2008 | Powell |
| 2008/0186229 | A1 | 8/2008 | Van Diggelen |
| 2009/0117928 | A1 | 5/2009 | Ladd |
| 2009/0160705 | A1 | 6/2009 | Matsuzaki |
| 2009/0315764 | A1 | 12/2009 | Cohen |
| 2010/0030916 | A1 | 2/2010 | Greenwood Graham |
| 2010/0034190 | A1 | 2/2010 | Yun |
| 2010/0073228 | A1 | 3/2010 | Smith |
| 2010/0117899 | A1 | 5/2010 | Papadimitratos |
| 2010/0231448 | A1 | 9/2010 | Harper |
| 2010/0253578 | A1* | 10/2010 | Mantovani ............... 342/357.76 |
| 2010/0254225 | A1 | 10/2010 | Schweitzer, III |
| 2011/0001668 | A1 | 1/2011 | Cobb |
| 2011/0035066 | A1 | 2/2011 | Schweitzer |
| 2011/0068973 | A1 | 3/2011 | Humphreys |
| 2011/0085540 | A1 | 4/2011 | Kuwabara |
| 2011/0102258 | A1 | 5/2011 | Underbrink |
| 2011/0102259 | A1 | 5/2011 | Ledvina |
| 2011/0181466 | A1 | 7/2011 | Serrano |
| 2011/0227787 | A1 | 9/2011 | Gum |
| 2011/0261917 | A1 | 10/2011 | Bedrosian |
| 2011/0285586 | A1 | 11/2011 | Ferguson |
| 2012/0005326 | A1 | 1/2012 | Bradetich |
| 2012/0026037 | A1 | 2/2012 | Thomson |
| 2012/0066418 | A1 | 3/2012 | Foster |
| 2012/0179404 | A1 | 7/2012 | Lee |
| 2012/0182181 | A1 | 7/2012 | Dai |
| 2012/0195253 | A1* | 8/2012 | Irvine ............................ 370/328 |
| 2012/0195350 | A1 | 8/2012 | Das |
| 2012/0323397 | A1 | 12/2012 | Schweitzer, III |
| 2013/0157593 | A1 | 6/2013 | Achanta |
| 2013/0244624 | A1* | 9/2013 | Das et al. .................. 455/414.1 |
| 2013/0328606 | A1 | 12/2013 | Ravi |
| 2013/0335266 | A1 | 12/2013 | Vollath |
| 2014/0003199 | A1 | 1/2014 | Dougan |
| 2014/0094218 | A1* | 4/2014 | Hammes et al. ........... 455/550.1 |
| 2014/0100702 | A1 | 4/2014 | Schweitzer |
| 2014/0334477 | A1* | 11/2014 | Stahlin et al. ................ 370/347 |

OTHER PUBLICATIONS

Shepard, D., Humphreys, T., Fansler, A., "Evaluation of the Vulnerability of Phasor Measurement Units to GPS Spoofing Attacks", Oct. 2, 2011.

PCT/US2014/010422 Patent Cooperation Treaty, International Search Report and Written Opinion of the International Searching Authority, Sep. 16, 2014.

PCT/US2013/058297, Patent Cooperation Treaty, International Search Report and Written Opinion of the International Searching Authority, Feb. 14, 2014.

PCT/US2013/065695, Patent Cooperation Treaty, International Search Report and Written Opinion of the International Searching Authority, Mar. 10, 2014.

PCT/US2013/065447, Patent Cooperation Treaty, International Search Report and Written Opinion of the International Searching Authority, Mar. 13, 2014.

PCT/US2013/064942 Patent Cooperation Treaty, International Search Report and Written Opinion of the International Searching Authority, Jan. 29, 2014.

Tippenhauer, N.O., Popper, C., Rasmussen, K.B., Capkun, S., On the Requirements for Successful GPS Spoofing Attacks, In Proceedings of the ACM Conference on Computer and Communications Security (CCS), Oct. 2011.

Moore, P., Crossley, P., GPS Applications in Power Systems Part 1 Introduction to GPS, Tutorial: GPS in Power Systems, Power Engineering Journal, Feb. 1999.

Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Wen, H., Huang, P. Y., Dyer, J., Archinal, A., Fagan, J., "Countermeasures for GPS Signal Spoofing," Proceedings of the 18th International Technical Meeting of the Satellite Division of The Institute of Navigation (ION GNSS 2005), Long Beach, CA, Sep. 2005, pp. 1285-1290.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

PCT/US2013/064012, Patent Cooperation Treaty, International Search Report and Written Opinion of the International Searching Authority, Dec. 19, 2013.

PCT/US2014/049813 Patent Cooperation Treaty, International Search Report and Written Opinion of the International Searching Authority, Apr. 2, 2015.

PCT/US2014/034358 Patent Cooperation Treaty, International Search Report and Written Opinion of the International Searching Authority, Sep. 22, 2014.

\* cited by examiner

SYNCHRONIZED CLOCK EVENT REPORT

TECHNICAL FIELD

This disclosure relates to a synchronized clock capable of analyzing data relating to time inputs to determine the cause of a particular time event. More particularly, this disclosure relates to identifying a cause or source of failure or manipulation that affects the synchronization of the clock based on a global navigational satellite system (GNSS) signal or other time signal.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
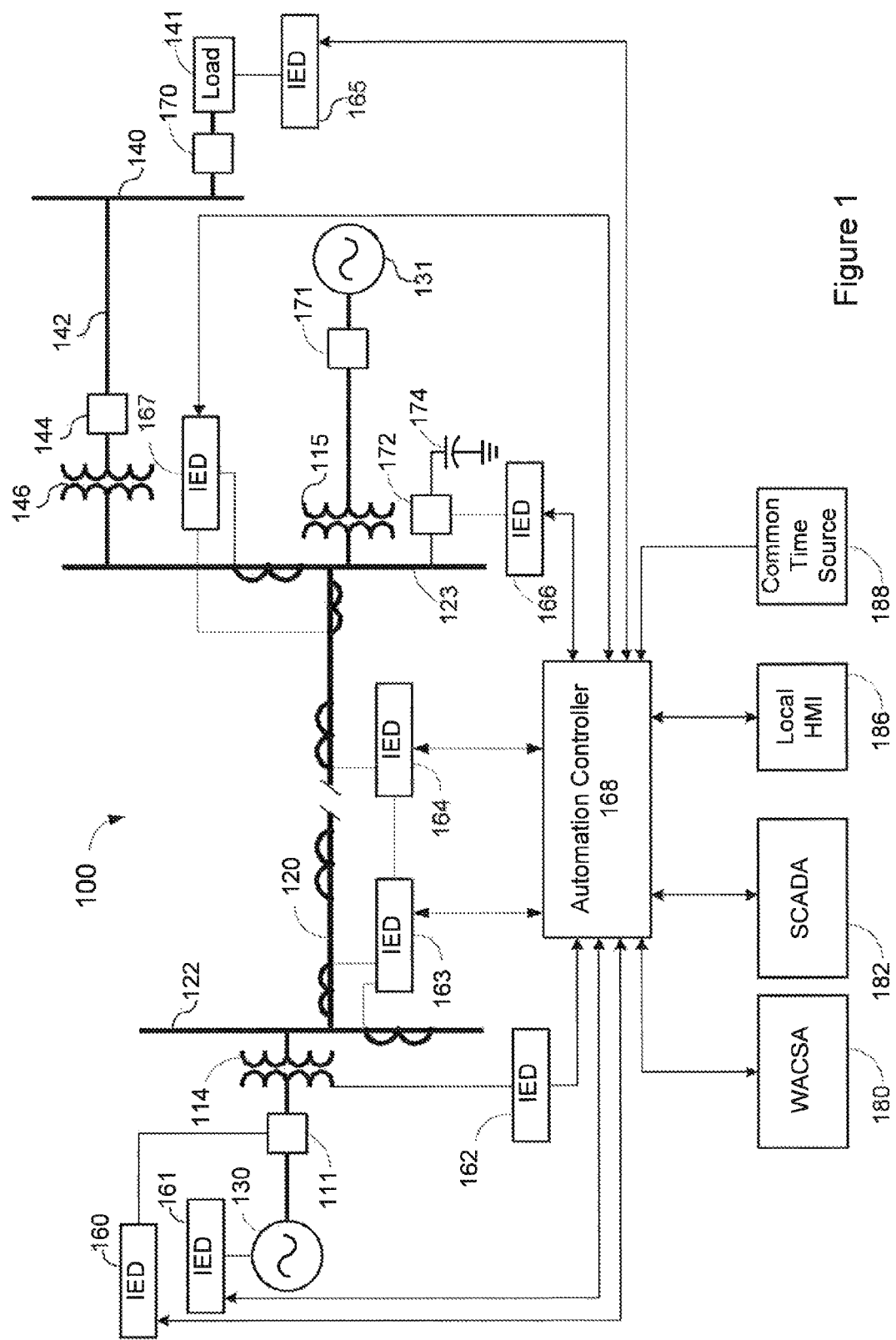
FIG. 1 illustrates a simplified one-line diagram of an electric power delivery system.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of non-transitory machine-readable media suitable for storing electronic instructions.

FIG. 1 illustrates a simplified diagram of an example of an electric power delivery system 100 consistent with embodiments disclosed herein. The systems and methods described herein may be applied and/or implemented in the electric power delivery system 100 illustrated in FIG. 1. Although illustrated as a one-line diagram for purposes of simplicity, an electrical power delivery system 100 may also be configured as a three-phase power system. The electric power delivery system 100 may include electric generators 130 and 131 configured to generate an electrical power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. It should be noted that additional transformers or other equipment may be used to further step down a voltage from the distribution bus 140 to the load 141.

Various other equipment may be included in the electric power delivery system. Also illustrated is switched capacitor bank ("SCB") 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131 may be any generator capable of providing electric power to the electric power delivery system and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as power-electronically coupled interfaces, for example, doubly-fed induction machines, direct coupled AC-DC/DC-AC transfer devices, and the like. It should be noted that these are not exhaustive lists, and other equipment, machines, and connected devices may be considered under this disclosure.

Modern electric power delivery systems (which may include electric power generation systems, transmission systems, distribution systems, and consumption systems) are typically controlled using intelligent electronic devices (IEDs). FIG. 1 illustrates several IEDs 160-167 that may be configured to control one or more elements of the electric power delivery system. An IED may be any processor-based device that controls monitored equipment within an electric power delivery system (e.g., system 100). In some embodiments, the IEDs 160-167 may gather equipment status from one or more pieces of monitored equipment (e.g., generator 130). Equipment status may relate to the status of the monitored equipment, and may include, for example, breaker or switch status (e.g., open or closed), valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like. With the equipment status and/or measurements, IEDs may be configured to derive or calculate derived values, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

According to certain embodiments, IEDs 160-167 may issue control instructions to the monitored equipment in order to control various aspects relating to the monitored equipment. Some examples of actions to control equipment include: opening a breaker which disconnects a generator with a rotor angle moving towards instability; opening a breaker which sheds load that is causing a voltage to decline towards a collapsing condition; opening a breaker to remove an asset when the asset, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore preemptively preventing the generator from being removed from service by a reactive power control; activating a dynamic brake which counters the acceleration of a machine rotor; adjusting a set-point on a governor to limit the power output of a synchronous machine so that it does not exceed the safe operating limits; simultaneously adjusting set-points of other synchronous machines so that they pick-up the new load; and, adjusting a voltage regulation set-point of an automatic voltage regulator such that a voltage at a more distant point in the power system does not exceed its maximum or minimum voltage threshold; and the like.

An IED (e.g., IED 160) may be in communication with a circuit breaker (e.g., breaker 111), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device or equipment to perform a certain action, may be generally referred to as control instructions.

IEDs 160-167 may be communicatively linked together using a data communications network, and may further be communicatively linked to a central monitoring system, such as a supervisory control and data acquisition (SCADA) system 182, and/or a wide area control and situational awareness (WACSA) system 180. In certain embodiments, various components of the electrical power generation and delivery system 100 illustrated in FIG. 1 may be configured to generate, transmit, and/or receive GOOSE messages, or communicate using any other suitable communication protocol. For example, an automation controller 168 may communicate certain control instructions to IED 163 via messages using a GOOSE communication protocol.

The illustrated embodiments are configured in a star topology having an automation controller 168 at its center, however, other topologies are also contemplated. For example, the IEDs 160-167 may be communicatively coupled directly to the SCADA system 182 and/or the WACSA system 180. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like. Further, in some embodiments, the IEDs 160-167 and other network devices (e.g., one or more communication switches or the like) may be communicatively coupled to the communications network through a network communications interface.

Consistent with embodiments disclosed herein, IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., SCADA system 182 or WACSA 180) may be facilitated by an automation controller 168. The automation controller 168 may also be referred to as a central IED, communication processor, or access controller. In various embodiments, the automation controller 168 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. No. 5,680,324, U.S. Pat. No. 7,630,863, and U.S. Patent Application Publication No. 2009/0254655, the entireties of which are incorporated herein by reference.

The IEDs 160-167 may communicate a variety of types of information to the automation controller 168 including, but not limited to, operational conditions, status and control information about the individual IEDs 160-167, event (e.g., a fault) reports, communications network information, network security events, and the like. In some embodiments, the automation controller 168 may be directly connected to one or more pieces of monitored equipment (e.g., electric generator 130 or breakers 111, or 172).

The automation controller 168 may also include a local human machine interface (HMI) 186. In some embodiments, the local HMI 186 may be located at the same substation as automation controller 168. The local HMI 186 may be used to change settings, issue control instructions, retrieve an event report (which may originate from a specified IED), retrieve data, and the like. The automation controller 168 may further include a programmable logic controller accessible using the local HMI 186.

The automation controller 168 may also be communicatively coupled to a common time source (e.g., a clock) 188. In certain embodiments, the automation controller 168 may generate a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In some embodiments, the WACSA system 180 may receive and process the time-aligned data, and may coordinate time synchronized control actions at the highest level of the electrical power generation and delivery system 100. In other embodiments, the automation controller 168 may not receive a time signal, but a common time signal may be distributed to IEDs 160-167.

The common time source 188 may also be used by the automation controller 168 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without digital phase locked loops, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the automation controller 168 may serve as the common time source 188 by distributing a time synchronization signal.

Several different GNSS systems (also referred to as GNSS constellations) are available or planned to be available. Some examples of a currently operational GNSS include the United States NAVSTAR Global Positioning System (GPS) system and the Russian GLONASS. Some examples of a GNSS planned for future operation include China's Beidou Navigation Satellite System (BDS), and the European Union's Galileo positioning system. It should be noted that a single GNSS system may include separate constellations (such as, for example, the BDS including a limited test system at a first constellation as well as a system being constructed at a second constellation).

As is detailed above, the electric power delivery system 100 illustrated in FIG. 1 includes local control and protection using IEDs 160-167, and wide-area control using the automation controller 168 and/or WACSA 180 and/or SCADA 182.

Figure 2:
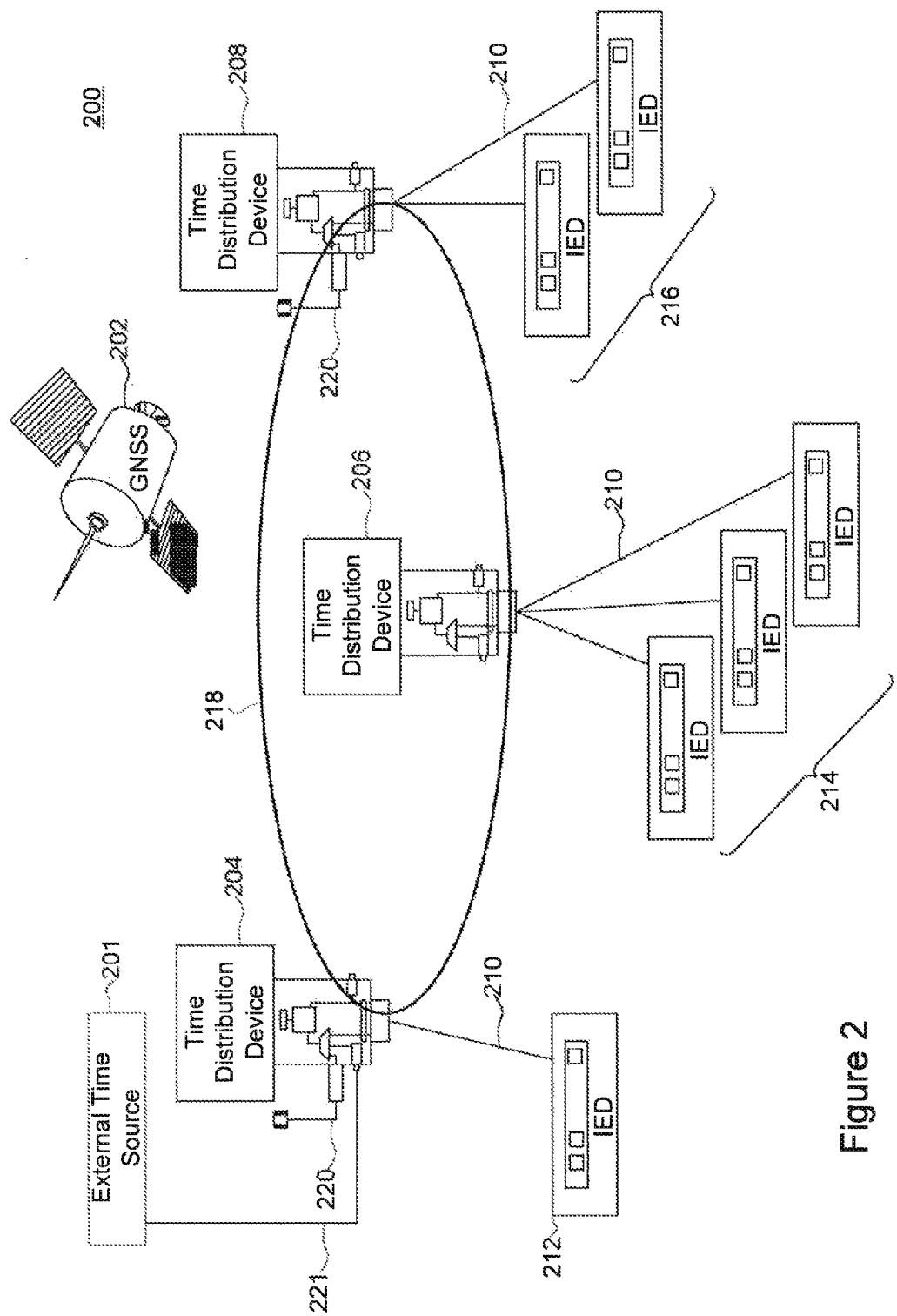
FIG. 2 illustrates an example system of reliable, redundant, and distributed time distribution devices.

FIG. 2 illustrates system 200 configured to be a highly reliable, redundant, and distributed system of time distribution devices 204, 206, and 208 capable of providing a precision time reference to various time dependent IEDs 212, 214, and 216 or automation controllers 168 as described above with respect to FIG. 1. Each time distribution device 204, 206, and 208 may be configured to receive and communicate time signals through multiple protocols and methods. While the system 200 is described as being capable of performing numerous functions and methods, it should be understood that various systems are possible that may have additional or fewer capabilities. Specifically, a system 200 may function as desired using only one protocol, or having fewer external or local time signal inputs.

As illustrated in FIG. 2, three time distribution devices 204, 206, and 208 have WAN capabilities and are communicatively connected to a WAN 218, which may comprise one or more physical connections and protocols. Each time distribution device 204, 206, and 208 may also be connected to one or more IEDs within a local network. For example, time distribution device 204 is connected to IED 212, time distribution device 206 is connected to IEDs 214, and time distribution device 208 is connected to IEDs 216. A time distribution device may be located at, for example, a power generation facility, a distribution hub, a substation, a load center, or other location where one or more IEDs are found. In various embodiments, an IED may include a WAN port, and such an IED may be directly connected to WAN 218. IEDs may be connected via WAN 218 or connection 210. Connection 210 may be, for example, a local area network (LAN) or a dedicated time communication link, such as an Inter-Range Instrumentation Group (IRIG) compliant communication link. In various embodiments, connection 210 may include multiple connections, for example, both a LAN and IRIG connection. Time distribution devices 204, 206, and 208 may establish and maintain a precision time reference among various system components. Each time distribution device 204, 206, and 208 may be configured to communicate time information with IEDs connected on connection 210 through one or more time distribution protocols, such as IEEE 1588.

Each time distribution device 204, 206, and 208 is configured to receive time signals from a variety of time sources. For example, as illustrated, time distribution device 204 includes an antenna 220 and is configured to receive a GNSS signal from a GNSS repeater or satellite 202. Time distribution device 204 is also configured to receive a second time signal 221 from an external time source 201. The external time source may comprise one or more voltage-controlled temperature-compensated crystal oscillators (VCTCXOs), phase locked loop oscillators, time locked loop oscillators, rubidium oscillators, cesium oscillators, NIST broadcasts (e.g., WWV and WWVB), and/or other devices capable of generating precise time signals. In the illustrated embodiment, time distribution device 208 includes an antenna 220 configured to receive a GNSS signal from the GNSS repeater or satellite 202. As illustrated, time distribution device 206 does not directly receive an external time signal, however, according to alternative embodiments, any number and variety of external time signals may be available to any of the time distribution devices.

According to one embodiment, WAN 218 comprises a synchronous optical network (SONET) configured to embed a precision time reference in a header or overhead portion of a SONET frame during transmission. Alternatively, a precision time reference may be conveyed using any number of time communications methods including IRIG protocols, NTP, SNTP, synchronous transport protocols (STP), and/or IEEE 1588 protocols. According to various embodiments, including transmission via SONET, a precision time reference may be separated and protected from the rest of the WAN network traffic, thus creating a secure time distribution infrastructure. Protocols used for inter IED time synchronization may be proprietary, or based on a standard, such as IEEE 1588 Precision Time Protocol (PTP).

According to various embodiments, time distribution devices 204, 206, and 208 are configured to perform at least one of the methods of detecting failure of a time source described herein. System 200 may utilize a single method or combination of methods, as described herein.

It is of note that even the most precise time signals may exhibit small discrepancies. For example, depending on the length and routing of the GNSS antenna cable, various clocks may exhibit microsecond level time offsets. Some of these offsets may be compensated for by the user entering compensation settings, or may need to be estimated by the time synchronization network. Estimation may be performed during long periods of "quiet" operation (i.e., periods with no faults), with the individual source results stored locally in a nonvolatile storage register.

As can be seen, IEDs may receive time signals from one or more GNSS signals. Different IEDs may receive time signals from one or more GNSS signal sources that are different from the GNSS signal sources for other IEDs. That is, several different GNSS sources are available. The GPS system, for example, consists of around 32 satellites that orbit the Earth twice per sidereal day. Accordingly, several satellites are visible to each receiver at any given time, and different satellites may be visible to different receivers at different times each day.

Signals from the GNSS satellites arrive at the receivers, and may be used by the receivers to calculate position as well as time. Receivers in the systems of FIGS. 1 and 2 are typically stationary, using the GNSS signals to calculate time, and provide a common time to devices on the system.

Receivers of such signals may be vulnerable to attacks or manipulation such as blocking, jamming, and spoofing. In some cases, the GNSS receiver may continue to indicate that the signal is good, and signal lock may be maintained. Such attacks may attempt to prevent a position lock, or feed a receiver false information such that the receiver calculates a false position and/or time. Spoofing, or other manipulation, of time information in a system such as those of FIGS. 1 and 2 may introduce errors in the derived values by the IEDs, and/or errors into time stamps of equipment status, measurements, derived values, and communications among the devices. Such errors may result in improper control of the electric power delivery system. Accordingly, what is needed is detection of, and mitigation against such attacks.

Figure 3:
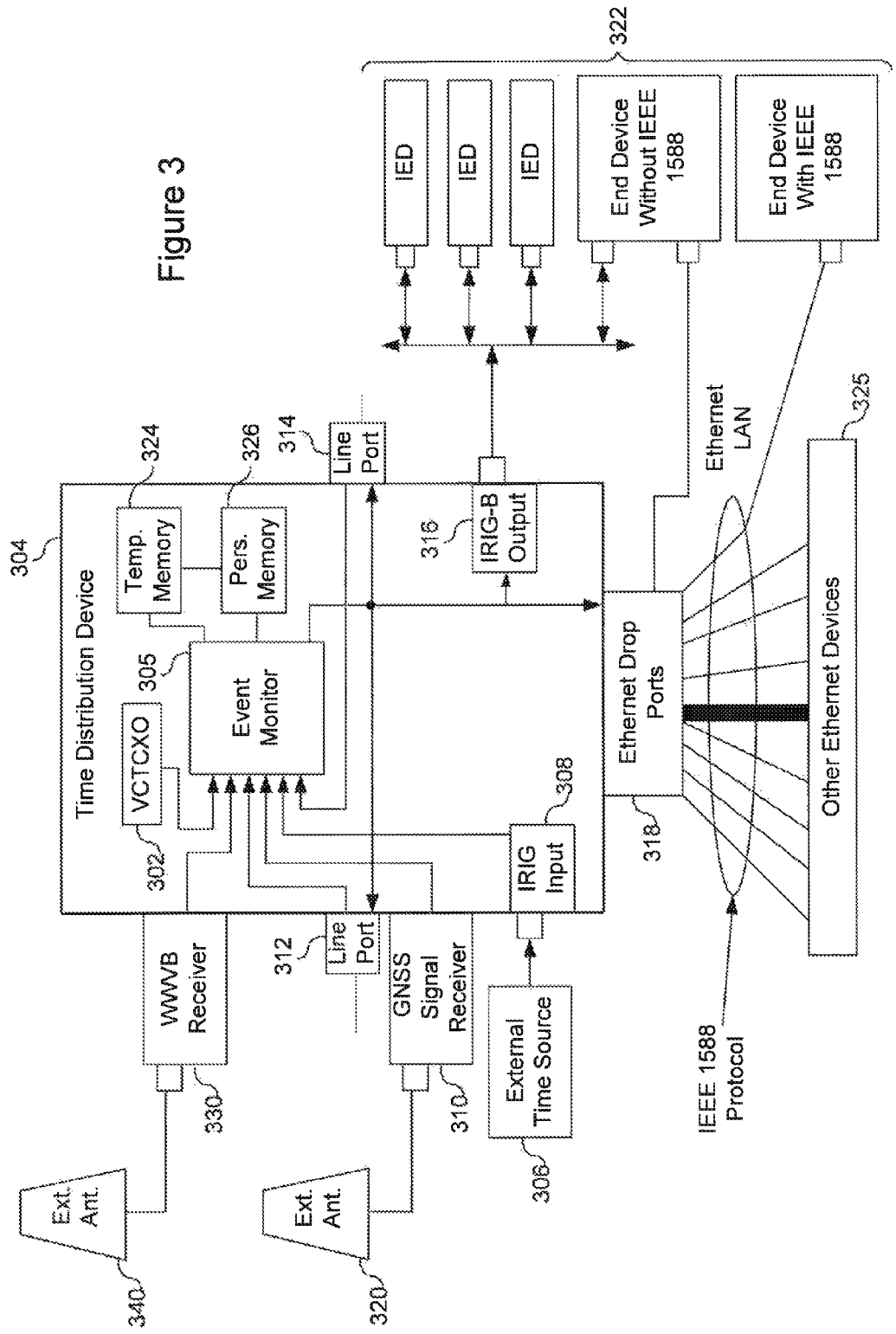
FIG. 3 illustrates a time distribution device for providing a time signal to one or more consuming devices.

FIG. 3 illustrates a time distribution device 304, according to one embodiment, for providing a time signal to one or more consuming devices. In various embodiments, time distribution device 304 may include more or less functionality than the illustration. For example, time distribution device 304 may include an interface for monitoring equipment in an electric power delivery system in certain embodiments. Accordingly, in various embodiments, time distribution device 304 may be implemented either as an IED or as a network device. As illustrated, time distribution device 304 receives time inputs from various sources. In various embodiments, the time distribution device 304 may include a local time source 302 such as a voltage-controlled temperature-compensated crystal oscillator (VCTCXO), temperature-compensated crystal oscillator (TCXO), oven-controlled crystal oscillator (OCXO), or the like, that provides a local time signal. Time distribution device 304 may further include a pair of line ports 312 and 314 for communications with a WAN or LAN to provide time inputs. Further, time distribution device 304 may include a GNSS signal receiver 310 for receiving a GNSS time signal via GNSS antenna 320. Time distribution device 304 may also include a WWVB receiver 330 for receiving an NIST broadcast, via an external antenna 340, which may include a time signal. The time distribution device 304 may also receive a time input from an external time source 306 that may be communicated over an IRIG time distribution protocol via input 308. Time distribution device 304 may be equipped to receive time signals from various other time sources and via various other protocols known in the art.

The time distribution device 304 functions to determine a precision time reference for use by the various devices connected to the time distribution device 304. For example, the precision time reference may be communicated from the time distribution device 304 to the various devices 322 and/or 325 using IRIG protocol via the IRIG-B output 316 or IEEE 1588 via Ethernet Drop Ports 318. The Ethernet Drop Ports 318 may also include network communications to the various devices connected to time distribution device 304. In various embodiments, time distribution device 304 may further include connections to SONETs (not shown) and transmit the precision time reference in a header or overhead portion of SONET frames.

In the example of FIG. 3, time distribution device 304 further includes an event monitor 305 for monitoring the various time inputs to detect a defined time event. For example, the defined event may be a loss of a signal from one of the time inputs. As illustrated, the various time inputs from the local time source 302, WAN (from line ports 312 and/or 314), GNSS signal receiver 310, WWVB receiver 330, and IRIG input 308 are input into the event monitor 305. The event monitor 305 may be coupled with a memory, for example, temporary memory 324 and/or persistent memory 326, where data relating to the time inputs may be recorded. In various embodiments, the temporary and persistent memory may be a single memory device, multiple memory devices, part of the time distribution device, or separate from the time distribution device.

In various embodiments, the time distribution device 304 and the various components of the time distribution device may be implemented using a processor in communication with a computer-readable storage medium containing machine executable instructions. In other embodiments, time distribution device 304 and its components may be embodied as hardware, such as an application specific integrated circuit, or the like, or a combination of hardware and software.

Figure 4:
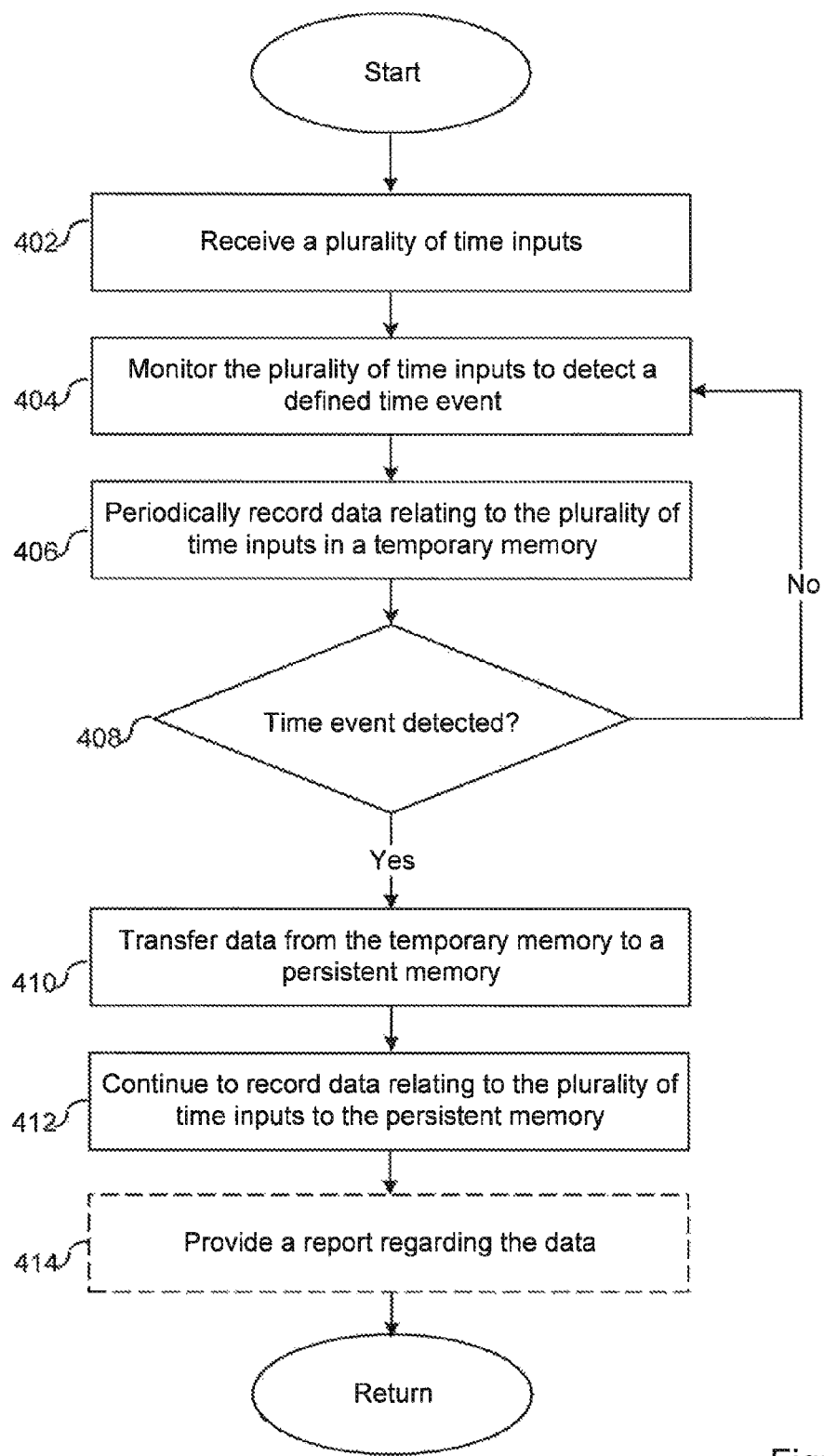
FIG. 4 illustrates a method for detecting a time event and creating an event report.

FIG. 4 illustrates a method for detecting a time event and creating an event report. At 402 the time distribution device 304 receives a plurality time inputs. As described above, the time inputs may include a time from a local oscillator, an IRIG protocol time signal, a GNSS time signal, an IEEE 1588 protocol time signal, an NTP protocol time signal, an SNTP protocol time signal, and the like.

At 404, the event monitor 305 monitors the plurality of time inputs received by the time distribution device 304 to detect a defined time event. The defined time event may be, for example, loss of a time signal from one of the plurality of time inputs, manipulation of a time signal, acquisition of a time signal, use of alternate time signal, power loss, or the like.

In addition to monitoring the plurality of time inputs, at 406, event monitor may periodically record data relating to the plurality of time inputs in temporary memory 324. In one embodiment, data relating to the plurality of time inputs may be recorded once per second. The data stored in the temporary memory may be stored on a rolling window basis. That is, after being stored in the temporary memory for a defined period of time, data may be released from the temporary memory. The defined period of time may be chosen based on an amount of time sufficient to be used in determining the cause of the defined time event. In one embodiment, the data may be stored in the temporary memory for two minutes before being released, for example. This rolling window allows the event monitor to frequently record data relating to the plurality of time inputs without the need for a large storage capacity.

In various embodiments, data relating to the plurality of time inputs may include, for example, the status of a signal received at an antenna, the status of a signal received at the time distribution device, antenna locations, signal strength, ephemeris data, diagnostic information, date, time, or the like. In the example of a GNSS time input, the following data may be stored: date, time, time source, time quality, satellites in view (PRN numbers), signal levels for the visible satellites, satellites in fix (PRN numbers), position dilution of precision, system events, and a plurality of binary flags, including, spoofing detection, jamming detection, PDOP too high, position value questionable, self survey in progress, leap second adjustment pending, leap second inserted, leap second deleted, daylight saving time adjustment pending, daylight saving time started, daylight saving time ended, simulation mode active, settings changed, change in almanac, change in ephemeris, or the like In addition to storing data relating to the plurality of time inputs, event monitor 305 may record time data received from various components to which the time distribution device provides a time signal. For example, the time distribution device may receive an NTP, PTP, and/or IRIG time information from a connected device.

At 408, if the event monitor has not detected a defined time event, the event monitor continues to monitor the plurality of time inputs at 404. If the even monitor has detected a defined time event, at 410, the event monitor may initiate a transfer of the data relating to the plurality of time sources from the temporary memory to a persistent memory where the data may be persistently stored. Further, at 412, the event monitor continues to record data relating to the plurality of time signals to the persistent memory for a defined period of time. The defined period of time that data may be chosen based on an amount of time sufficient to be used in determining the cause of the defined time event. In one embodiment, the event monitor may continue to record data to the persistent memory for thirteen minutes after detecting the defined time event.

Optionally, at 414, the event monitor may provide a report to a user of the data relating to the plurality of time inputs. The report may be used by the user to determine a cause of the defined time event.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method comprising:
    receiving a plurality of time inputs at a time signal distribution device from time sources external to the time distribution device;
    monitoring the plurality of time inputs to detect a defined time event from the plurality of time inputs;
    periodically recording data relating to the plurality of time inputs in a temporary memory, wherein the data relating to the plurality of time inputs is retained in the temporary memory for a first defined time; and
    in response to detecting the defined time event:
        transferring the data relating to the plurality of time inputs from the temporary memory to a persistent memory; and
        continuing to periodically record data relating to the plurality of time inputs to the persistent memory for a second defined time.

2. The method of claim 1, further comprising providing a report of the data stored in the persistent memory to determine a cause of the defined time event.

3. The method of claim 1, wherein the plurality of time inputs are received using one or more of: an Inter-Range Instrumentation Group (IRIG) protocol, a global navigational satellite system (GNSS) signal, a radio broadcast, an IEEE 1588 protocol, a network time protocol (NTP), or a simple network time protocol (SNTP).

4. The method of claim 1, wherein a time input of the plurality of time inputs is received from a GNSS signal and the defined time event is a loss of a satellite lock.

5. The method of claim 4, wherein the data relating to a time input received using a GNSS signal includes antenna location, antenna status, signal strength, ephemeris data, and/or diagnostic information.

6. The method of claim 1, wherein periodically storing data relating to the plurality of time inputs comprises storing a snapshot of data relating to the plurality of time inputs at a rate of one snapshot per second.

7. The method of claim 1, further comprising periodically storing data relating to a plurality of system components which receive a time from the time distribution device.

8. The method of claim 1, wherein the defined time event comprises time signal manipulation.

9. A time signal distribution device for receiving and distributing a time signal, comprising:
    a plurality of receivers, each configured to receive a time signal of a plurality of time signals external to the time distribution device;
    a temporary memory for periodically storing data relating to the plurality of time signals, wherein the temporary memory is configured to retain the data relating to the plurality of time signals for a first defined time;
    an event monitor for detecting a defined time event from the plurality of time inputs; and
    a persistent memory for storing the data from the temporary memory in response to the event detector detecting the defined event and periodically storing data relating to the plurality of time signals for a second defined time after detecting the defined time event.

10. The time signal distribution device of claim 9, further comprising an event reporting component configured to provide a report of the data stored in the persistent memory to determine a cause of the defined time event.

11. The time signal distribution device of claim 9, wherein the plurality of receivers comprises receivers configured to receive time signals using one or more of: an Inter-Range Instrumentation Group (IRIG) protocol, a global navigational satellite system (GNSS) signal, a radio broadcast, an IEEE 1588 protocol, a network time protocol (NTP), or a simple network time protocol (SNTP).

12. The time signal distribution device of claim 9, wherein a receiver of the plurality of receivers is a GNSS receiver suitable for receiving a GNSS signal and the defined time event is a loss of a lock on the GNSS signal.

13. The time signal distribution device of claim 12, wherein the data relating to a GNSS time signal stored in the temporary memory includes antenna location, antenna status, signal strength, ephemeris data, and/or diagnostic information.

14. The time signal distribution device of claim 9, wherein periodically storing data relating to the plurality of time signals comprises storing a snapshot of data relating to the plurality of time signals at a rate of one snapshot per second.

15. The time signal distribution device of claim 9, wherein the time distribution device is further configured to periodically store, in the temporary memory, data relating to a plurality of system components which receive a time from the time distribution device and transfer the data relating to the plurality of system components to the persistent memory in response to the defined time event.

16. The time distribution device of claim 9, wherein the defined time event comprises time signal manipulation.

17. The time distribution device of claim 9, wherein the defined time event comprises loss of a time signal of the plurality of time signals.

18. The time distribution device of claim 9, wherein the defined time event comprises acquisition of a time signal.

19. The time distribution device of claim 9, wherein the defined time event comprises use of an alternate time signal.

20. A time signal distribution device for receiving and distributing a time signal, comprising:
a global navigational satellite system (GNSS) receiver suitable for receiving a plurality of external GNSS signals and determining time information from the GNSS signals;
an event monitor configured to collect data relating to the GNSS signals and detect a defined time event from the plurality of external GNSS signals;
a temporary memory for periodically storing the data relating to the GNSS signals, wherein the temporary memory is configured to retain the data relating to the GNSS signals for a first defined time; and
a persistent memory for storing the data from the temporary memory in response to the event detector detecting the defined event and periodically storing data relating to the GNSS signals for a second defined time.

* * * * *